(No Model.)
A. McDONALD.
MACHINERY FOR SUPPORTING AND REVOLVING A DISK SHAPED CUTTER
No. 276,260. Patented Apr. 24, 1883.
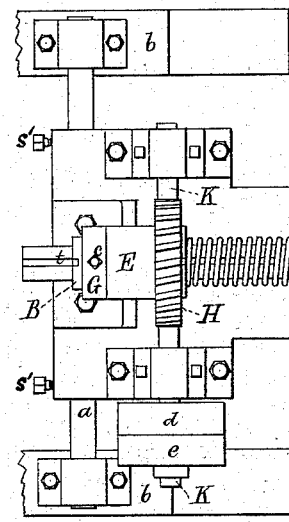
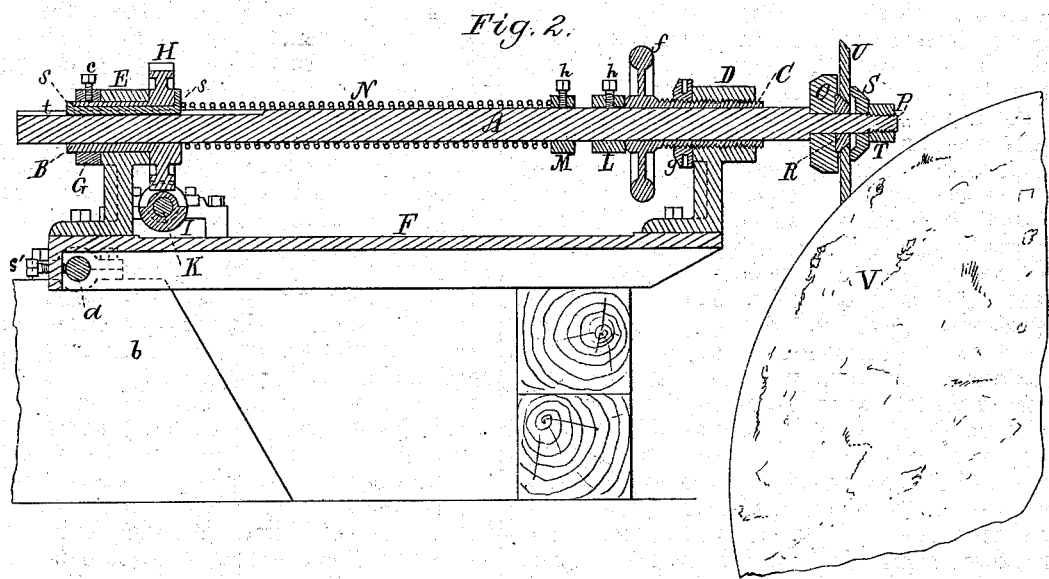
Witnesses.
S. N. Piper
E. B. Pratt
Inventor
Alexander McDonald
by R. H. Eddy atty.

UNITED STATES PATENT OFFICE.

ALEXANDER McDONALD, OF CAMBRIDGE, MASSACHUSETTS, ASSIGNOR TO THE McDONALD STONE CUTTING MACHINE COMPANY, OF NASHUA, N. H.

MACHINERY FOR SUPPORTING AND REVOLVING A DISK-SHAPED CUTTER.

SPECIFICATION forming part of Letters Patent No. 276,260, dated April 24, 1883.

Application filed February 26, 1883. (No model.)

*To all whom it may concern:*

Be it known that I, ALEXANDER McDONALD, of Cambridge, in the county of Middlesex, of the Commonwealth of Massachusetts, have invented a new and useful improvement in machinery for supporting and revolving a disk-shaped cutter while in the act of being ground or sharpened by a grindstone; and I do hereby declare the same to be described in the following specification and represented in the accompanying drawings, of which—

Figure 1 is a top view, and Fig. 2 a longitudinal and vertical section, of a machine embodying my invention, the nature of which is defined in the claims hereinafter presented.

In the said drawings, A denotes a mandrel extending through two rotary sleeves, B and C, supported by and so as to revolve in two standards, D E. The said standards extend upward from a bed-plate, F, which, near its rear end, is pivoted upon a cylindrical rod, *a*, supported near its ends by posts *b b*, the whole being so as to enable the bed-plate to be moved laterally and turned upward or downward on the rod. To this end the shaft is carried through cylindrical holes made in flanges extending down from the bed-plate, each of such holes having a diameter corresponding with that of the shaft. Into the rear part of the bed-plate set-screws *s'* (see Figs. 1 and 2) are screwed against the shaft, such screws being to clamp the bed-plate to the shaft, as occasion may require, to prevent accidental lateral movement of the bed-plate on the shaft. The rearmost sleeve, B, is connected with the mandrel by a "feather-connection"—that is, by a stud, *s*, extended into a groove, *t*, made lengthwise in the mandrel, the whole being so as to enable the mandrel to slide lengthwise of it in the sleeve, and to be revolved by the latter when it may be in revolution. A collar, G, that encompasses the sleeve B, and is fastened to it by a set-screw, *c*, is placed next to the standard, there being fixed upon the sleeve a worm-gear, H, that engages with a worm or screw, I, carried by a shaft, K, arranged and provided, as represented, with a driving-pulley, *d*, and a loose pulley, *e*. The other sleeve, C, screws into and through the standard D, and is provided with a hand-wheel, *f*, and a check-nut, *g*, arranged as represented. Furthermore, there are on the mandrel, concentrically and in rear of the sleeve C, two collars, L M, each of which has a set-screw, *h*, to fix it in place on the mandrel. Between the collar M and the sleeve B there is a spiral spring, N, which encompasses the mandrel, such spring at one end bearing against the sleeve B or its worm-gear and at the other against the collar M. At the front end of the mandrel there is a circular head, O, from which a screw, P, extends, as represented. On this screw, concentrically, is a conic frustum, R, a disk, S, and a nut, T, all being as and arranged as represented.

A disk-cutter to be ground has a conical eye to encompass and fit upon the frustum R, such a cutter being shown at U. When in place the cutter is held to the mandrel by the nut, the frustum, and the disk. As a disk-cutter for cutting stone is very apt to become worn in its eye and in other respects, and as it is very necessary for the eye to be concentric with the cutting-edge, the frustum R becomes a means by which the cutter can readily adapt itself and fit to the frustum, and by having the frustum separate from and movable relatively to the head a thin washer may be placed between them, when necessary, to effect the proper fixture of the cutter to the frustum, it being sometimes requisite to use such a washer when the eye of the cutter may become so much worn as to cause the cutter to touch the head without suitably bearing on the frustum.

In Fig. 2 a portion of a grindstone is shown at V, in order to represent the arrangement of the cutter and grindstone when the latter may be engaged in sharpening the former.

The spiral spring is to press the cutter up to the stone, the screwed sleeve being to adjust the cutter to the stone or move it away therefrom, as occasion may require. The set-nut of the screwed sleeve is to secure the sleeve in position to prevent it from revolving while the mandrel may be in operation to revolve the disk-cutter against the grindstone, the latter at the time being in revolution.

The devices described for supporting the base at its rear end are to enable the machine to be moved not only to bring the cutter down upon the grindstone, but laterally on such from time to time, as may be necessary to prevent the periphery of the grindstone from being worn in a groove or grooves.

On the shaft K being put in revolution, a slow rotary movement of the mandrel will be produced, whereby the disk-cutter, while being ground or sharpened by the grindstone, will be gradually revolved, and will be formed with a sharp and circular cutting-edge, and be beveled therefrom, as represented, and have the said edge concentric with the eye.

The machine, made as described, has in practice been found to be highly useful and capable of operating to excellent advantage and with very economical results.

I claim—

1. The machine, substantially as described, for supporting and revolving a disk-shaped cutter while in the act of being ground or sharpened by a grindstone, such consisting of the base and two standards, the mandrel and its devices for affixing the cutter to it, the two sleeves, the spiral spring, the mechanism for slowly revolving the mandrel, and the set-nut and collars, all being arranged and adapted essentially and to operate as set forth.

2. The combination of the pivotal supporting-rod, supported substantially as explained, with the described machine, consisting of the bed, the standards, the mandrel and its devices for supporting a cutter, the two sleeves, the spiral spring, the mechanism for slowly revolving the mandrel, and the set-nut and collars, all arranged and adapted essentially and to operate as set forth.

ALEXANDER McDONALD.

Witnesses:
R. H. EDDY,
E. B. PRATT.